US009786147B2

(12) United States Patent
Hosomi

(10) Patent No.: US 9,786,147 B2
(45) Date of Patent: Oct. 10, 2017

(54) EVENT PROCESSING DEVICE, EVENT PROCESSING METHOD, AND EVENT PROCESSING PROGRAM

(71) Applicant: NEC CORPORATION, Tokyo (JP)

(72) Inventor: Itaru Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/903,269

(22) PCT Filed: Jun. 17, 2014

(86) PCT No.: PCT/JP2014/003243
§ 371 (c)(1),
(2) Date: Jan. 6, 2016

(87) PCT Pub. No.: WO2015/004854
PCT Pub. Date: Jan. 15, 2015

(65) Prior Publication Data

US 2016/0163172 A1 Jun. 9, 2016

(30) Foreign Application Priority Data

Jul. 10, 2013 (JP) ................................ 2013-144775

(51) Int. Cl.
*G08B 19/00* (2006.01)
*G08B 21/02* (2006.01)
(Continued)

(52) U.S. Cl.
CPC ............... *G08B 21/02* (2013.01); *G08B 5/22* (2013.01); *G08B 21/22* (2013.01)

(58) Field of Classification Search
CPC ........... G08B 21/02; G08B 5/22; G08B 21/22
(Continued)

(56) References Cited

U.S. PATENT DOCUMENTS 6,825,761 B2 * 11/2004 Christ .................. G08B 13/189 340/506
2005/0088295 A1 4/2005 Kondo et al.
(Continued)

FOREIGN PATENT DOCUMENTS

AU 2010230857 A1 10/2011
CN 1598888 A 3/2005
(Continued)

OTHER PUBLICATIONS

International Search Report (ISR) (PCT Form PCT/ISA/210), in PCT/JP2014/003243, dated Aug. 26, 2014.
(Continued)

*Primary Examiner* — Jack K Wang
(74) *Attorney, Agent, or Firm* — McGinn IP Law Group, PLLC

(57) ABSTRACT

An event processing device includes: an event detection unit that, when received data satisfies predetermined conditions, detects the data as an event; a data storage unit that, irrespective of the event detection result, stores data received by the event detection unit; a relevance information definition storage unit that stores relevance information definitions that define the association between data; an integrated analysis unit that, when data is newly stored in the data storage unit, links the newly stored data with past data included in the past data stored in the data storage unit and the relationship of which with the newly stored data satisfies the relevance information definition; and an event display unit that displays the newly stored data and the past data linked with each other.

16 Claims, 14 Drawing Sheets

(51) Int. Cl.

| | |
|---|---|
| ***G08B 21/22*** | (2006.01) |
| ***G08B 5/22*** | (2006.01) |
| *G05B 19/00* | (2006.01) |
| *G08B 23/00* | (2006.01) |
| *G08B 29/00* | (2006.01) |

(58) Field of Classification Search
USPC .......................................................... 340/522
See application file for complete search history.

(56) References Cited

U.S. PATENT DOCUMENTS

| | | | | |
|---|---|---|---|---|
| 2009/0281839 | A1* | 11/2009 | Lynn | G06F 19/321 705/3 |
| 2012/0063641 | A1 | 3/2012 | Venkatesh et al. | |
| 2012/0215908 | A1 | 8/2012 | Tsunoo et al. | |
| 2013/0067572 | A1 | 3/2013 | Muramoto | |
| 2013/0346016 | A1 | 12/2013 | Suzuki et al. | |
| 2016/0275776 | A1* | 9/2016 | Shen | G06F 19/345 |
| 2016/0322078 | A1* | 11/2016 | Bose | G11B 27/031 |

FOREIGN PATENT DOCUMENTS

| | | | |
|---|---|---|---|
| CN | 1983342 | A | 6/2007 |
| CN | 102449660 | A | 5/2012 |
| CN | 103117884 | A | 5/2013 |
| EP | 2 415 022 | A1 | 2/2012 |
| EP | 2 687 998 | A1 | 1/2014 |
| JP | 2005-065149 | A | 3/2005 |
| JP | 2009-199356 | A | 9/2009 |
| JP | 2012-088855 | A | 5/2012 |
| JP | 2012-523025 | A | 9/2012 |
| JP | 2013-061794 | A | 4/2013 |
| KR | 20050020712 | | 3/2005 |
| SG | 174519 | A1 | 10/2011 |
| WO | WO 2010/111748 | A1 | 10/2010 |
| WO | WO 2010/134241 | A1 | 11/2010 |
| WO | WO 2012/111144 | A1 | 8/2012 |
| WO | WO 2012/124259 | A1 | 9/2012 |

OTHER PUBLICATIONS

"Esper—Complex Event Processing", [online], EsperTech, [Retrieved on Jun. 17, 2013], Internet (URL: http://esper.codehaus.org/).
"Face detection/face comparison engine NeoFace", [online], NEC, [Retrieved on Jun. 17, 2013], Internet (URL: http://jpn.nec.com/face/).

* cited by examiner

Fig. 4

| PROPERTIES | INPUT DATA 1 | INPUT DATA 2 | INPUT DATA 3 |
|---|---|---|---|
| TYPE OF DETECTED INFORMATION | PERSON LYING DOWN | SCREAM | SPECIFIC UTTERANCE |
| DATE AND TIME OF DETECTION | 2013/06/14 21:40:14 | 2013/06/14 21:40:26 | 2013/06/14 21:41:05 |
| SENSOR | CAMERA 1 | MICROPHONE 3 | MICROPHONE 4 |
| SENSOR POSITION | 34.687549,135.526848 | 34.687684,135.526609 | 34.687493,135.526782 |
| CERTAINTY FACTOR | 0.96 | 0.79 | 0.68 |
| DETECTED CONTENT | | | AMBULANCE |

Fig. 5

| TYPE OF DETECTED INFORMATION | ALERT LEVEL |
|---|---|
| SCREAM | 2 |
| SPECIFIC UTTERANCE | 1 |
| PERSON LYING DOWN | 2 |
| FIRE | 3 |
| SMOKE | 2 |
| ABANDONMENT | 2 |
| CARRYING AWAY | 2 |

Fig. 6

| TYPE OF DETECTED INFORMATION 1 | TYPE OF DETECTED INFORMATION 2 | DEGREE OF RELEVANCE |
|---|---|---|
| SCREAM | PERSON LYING DOWN | 0.4 |
| SCREAM | BRAWL | 0.6 |
| SCREAM | SPECIFIC UTTERANCE "AMBULANCE" | 0.2 |
| SCREAM | SPECIFIC UTTERANCE "CALL 119" | 0.1 |
| PERSON LYING DOWN | SPECIFIC UTTERANCE "CALL 119" | 0.2 |
| PERSON LYING DOWN | SPECIFIC UTTERANCE "AMBULANCE" | 0.3 |
| PERSON LYING DOWN | INJURY | 0.6 |
| SPECIFIC UTTERANCE "CALL 119" | SPECIFIC UTTERANCE "AMBULANCE" | 0.9 |
| BRAWL | PERSON LYING DOWN | 0.3 |
| INJURY | BRAWL | 0.7 |

EVENT PROCESSING DEVICE, EVENT PROCESSING METHOD, AND EVENT PROCESSING PROGRAM

TECHNICAL FIELD

The present disclosure relates to an event processing apparatus, an event processing method, and an event processing program for processing an event detected from collected data.

BACKGROUND ART

Monitoring and analysis solutions for automatically detecting an important phenomenon (hereinafter, event) using data collected through a number of monitoring cameras and various sensors have been developed for the purpose of safety management and security of public spaces and facilities, and are being introduced in many countries in the world. In the field of the safety management and security, there is a requirement for automatically detecting both types of events, one type of event is an event about which the situation may be recognized from a short-time single scene such as intrusion into an off-limits facility and fire, and the other type of event is an event about which the situation may be recognized by observing the progress of circumstances and scale, such as baggage theft and demonstration march.

The event that can be recognized on the basis of a continuous state or movement of a short time, which can be acquired with a sensor including such as a monitoring camera or a microphone, can be detected by a recognition system that operates according to information supplied from each sensor. For example, regarding the detection of fire, a technology is known, that in the case where a smoke detection sensor is already provided in the interior of each building, the sensor device may be set up as a system that recognizes an event indicating the possibility of occurrence of fire, upon sensing smoke. In addition, PTL 1 discloses a technology of distinguishing between carrying away and leaving of a baggage using images of a monitoring camera, and detecting either event.

Further, a technology called complex event processing (hereinafter abbreviated as CEP) is known that includes detecting a specific complex event by combining a plurality of events recognized on the basis of data acquired through one or a plurality of sensors. A system, that employs general CEP technology, such as the one according to NPL 1 stores a rule that prescribes one or more conditions to be satisfied, according to the case where the order of input data is limited, and where the order of input data is not limited. When certain conditions in the stored rule are satisfied, the system executes a state transition, and applies the rule to the input data until reaching a finished state (where all conditions are satisfied). With the CEP designed like above, the result is provides only after all the conditions prescribed in a unit of rules are satisfied.

CITATION LIST

Patent Literature

[PTL 1]

PTL 1: International Publication No. WO2010/134241

Non Patent Literature

[NPL 1]

NPL 1: "Esper-Complex Event Processing", [online], EsperTech, [Retrieved on Jun. 17, 2013], Internet (URL: http://esper.codehaus.org/)

NPL 2: "Face detection/face comparison engine NeoFace", [online], NEC, [Retrieved on Jun. 17, 2013], Internet (URL: http://jpn.nec.com/face/)

SUMMARY OF INVENTION

Technical Problem

With the generally employed CEP, conditions that are not expressly defined in the rule are not evaluated. Accordingly, it is difficult to handle a case that the situation of an event makes further progress after detecting the event and providing result of the event. For example, the CEP is able to detect an event of leaving of baggage, when someone leaves a suspicious baggage in a facility. Such an event can be detected by a monitoring camera and an image recognition system.

On the other hand, in the case where another person carries away the baggage that has been left, it is possible that baggage theft has been committed. In such a case, both of the leaving and the carrying away of the baggage can be detected, with the image recognition system (which can be realized for example according to PTL 1) configured to respectively detect the carrying away and the leaving of the baggage. Further, the baggage theft can also be detected if the persons who left the baggage and who carried away the baggage can be determined as different persons, through comparing the features of those persons, with the image recognition system, that is configured to identify a person on the basis of the feature of his/her face, such like, for example, the product according to NPL 2. By specifying such series of condition decision process as a rule, the mentioned events may be automatically detected using the CEP.

Further, in the case where either of the person who left the baggage and the person who carried away the baggage is a person already marked as suspect, or a suspicious character involved with another event, the seriousness of the situation and the measures to be taken may be changed when such other events are associated. However, it is difficult to define in advance the CEP rule that covers the single event about leaving of baggage, events that have occurred before and after the single event, and all the events that has relevance with the single event and includes the relation to surrounding circumstances.

Technologies such as online analytical processing (OLAP) and data mining, designed to discover relevance between data from acquired data set instead of defining in advance all the decision conditions as a rule, are also widely employed. These technologies are, however, designed as batch processing for collectively processing the data accumulated up to a certain time point, rather than stream processing for sequentially processing the data inputted time after time, like the CEP. Therefore such technologies are difficult to be adopted for automatic monitoring that requires immediacy.

Accordingly, an objective of the disclosure is to provide an event processing apparatus, an event processing method, and an event processing program that enable detection of a complex event in which potentially relevant events are combined, while keeping immediacy of notification.

Solution to Problem

In an aspect, the disclosure provides an event processing apparatus including event detection unit which, when received data satisfies a predetermined condition, detects the data as an event, data storage unit which stores the data received by the event detection unit irrespective of a detection result of the event, relevance information definition storage unit which stores relevance information definition defining relevance between the data, integrated analysis unit which, when data is newly stored in the data storage unit, combines the newly stored data with past data included in the data stored in the data storage unit and a relationship of which with the newly stored data satisfies the relevance information definition, and event display unit which displays the past data and the newly stored data combined with each other.

In another aspect, the disclosure provides an event processing method including detecting, when received data satisfies a predetermined condition, the data as an event, storing the received data in data storage unit irrespective of a detection result of the event, combining, when data is newly stored in the data storage unit, the newly stored data with past data included in the data stored in the data storage unit and a relationship of which with the newly stored data satisfies relevance information definition defining relevance between the data, and displaying the past data and the newly stored data combined with each other.

In still another aspect, the disclosure provides an event processing program configured to cause a computer to execute an event detection process including detecting, when received data satisfies a predetermined condition, the data as an event, and storing the received data in data storage unit irrespective of a detection result of the event, an integrated analysis process including combining, when data is newly stored in the data storage unit, the newly stored data with past data included in the data stored in the data storage unit and a relationship of which with the newly stored data satisfies relevance information definition defining relevance between the data, and a data display process including displaying the past data and the newly stored data combined with each other.

Advantageous Effects of Invention

The disclosure enables detection of a complex event in which potentially relevant events are combined, while keeping immediacy of notification.

BRIEF DESCRIPTION OF DRAWINGS

FIG. 4 is an explanatory diagram showing examples of data inputted in the event processing apparatus;

FIG. 5 is an explanatory diagram showing examples of definition of alert level included in the relevance information definition;

FIG. 6 is an explanatory diagram showing examples of definition of degree of relevance included in the relevance information definition;

DESCRIPTION OF EMBODIMENTS

[Exemplary Embodiment 1]

Figure 1:
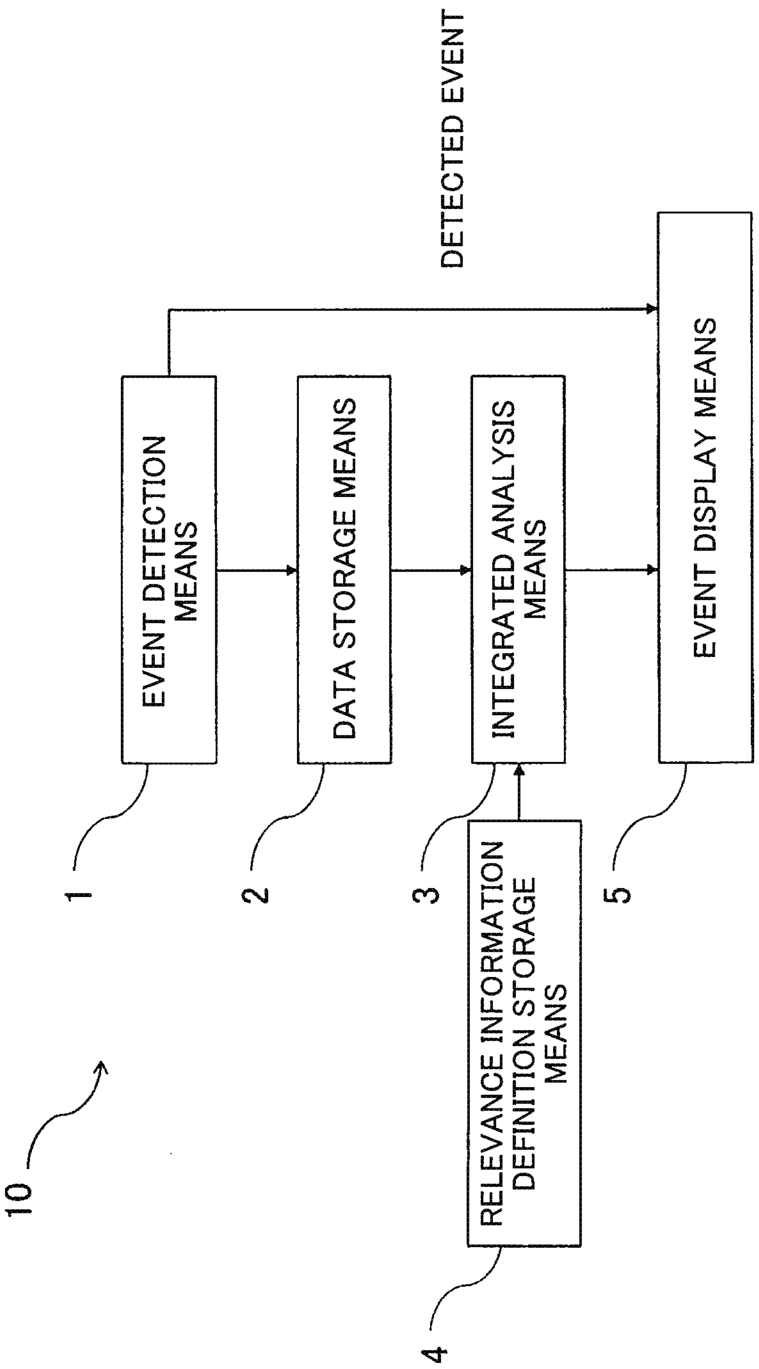
FIG. 1 is a block diagram showing a configuration of an event processing apparatus according to a first exemplary embodiment of the present disclosure.

Hereafter, a first exemplary embodiment of the present disclosure will be described with reference to the drawings. FIG. 1 is a block diagram showing a configuration of an event processing apparatus according to this exemplary embodiment. The event processing apparatus 10 shown in FIG. 1 includes event detection means 1, data storage means 2, integrated analysis means 3, relevance information definition storage means 4, and event display means 5.

The event detection means 1 receives data transmitted from an external source. The event detection means 1 detects an event when the received data satisfies a predetermined condition, and transmits the data of the event to the event display means 5. The event detection means 1 also stores the received data in the data storage means 2, irrespective of the detection result of the event.

The data storage means 2 stores therein the data supplied from the event detection means 1.

The integrated analysis means 3 determines the relevance between the data with respect to the data sequentially stored in the data storage means 2, and combines the related data. The integrated analysis means 3 transmits the data combination result to the event display means 5.

The relevance information definition storage means 4 stores therein relevance information definition necessary for the integrated analysis means 3 to determine the relevance between the data and combine the related data.

The event display means 5 is configured to display the event data, and the data combination result, that are transmitted from the event detection means 1 and the integrated analysis means 3, on a screen of a terminal apparatus.

Figure 2:
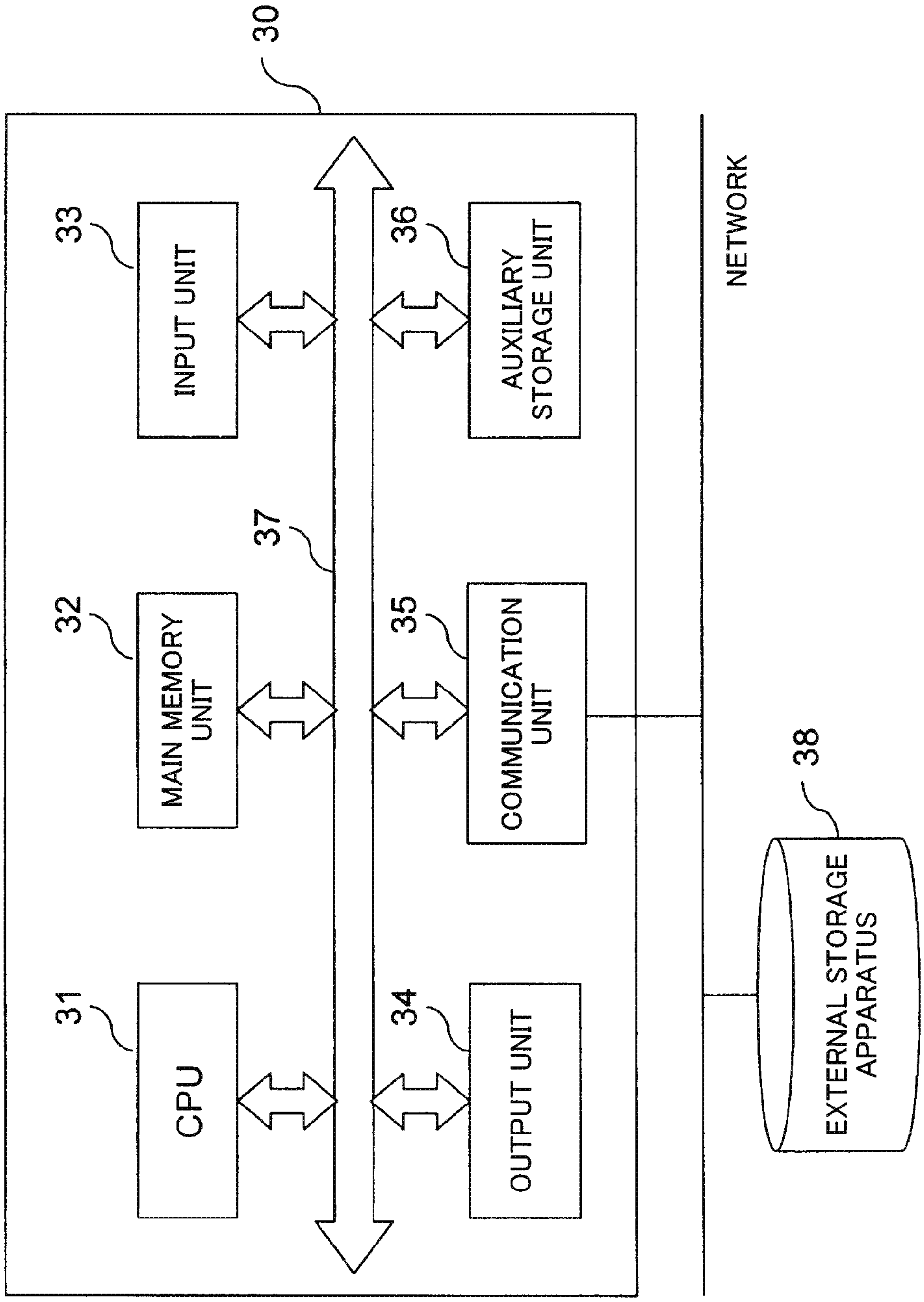
FIG. 2 is an explanatory diagram for explaining a hardware configuration of the event processing apparatus according to the disclosure.

FIG. 2 is a explanatory diagram for explaining a hardware configuration of the event processing apparatus according to this exemplary embodiment. The event processing apparatus according to this exemplary embodiment may be realized with the hardware configuration shown in FIG. 2. The event processing apparatus 30 shown in FIG. 2 at least includes a central processing unit (CPU) 31, a main memory unit 32, an output unit 34 for displaying a result or progress of processing to a user, a communication unit 35, and an auxiliary storage unit 36. The event processing apparatus 30 may further include an input unit 33 to be operated by the user.

The main memory unit 32 is a main memory constituted of, for example, a random access memory (RAM), and utilized as working area or temporary save area for the data. The input unit 33 includes inputting devices such as a keyboard and a mouse that are used by the user to input data and processing instructions. The output unit 34 may be for example a display apparatus such as an liquid crystal display (LCD) apparatus, or a printing apparatus such as a printer, capable of outputting the data. The communication unit 35 executes input and output of data with peripheral devices through wired or wireless network (information communication network). The auxiliary storage unit 36 may be realized by a hard disk apparatus or other storage device. As shown in FIG. 2, the aforementioned constituents of the event processing apparatus 30 are connected to one another via a system bus 37.

The auxiliary storage unit 36 stores a program for executing the event detection means 1, the data storage means 2, the integrated analysis means 3, the relevance information definition storage means 4, and the event display means 5, that are shown in FIG. 1. The auxiliary storage unit 36 also stores the data stored in the data storage means 2, and the relevance information definition stored in the relevance information definition storage means 4. The event processing apparatus 30 may be configured without the auxiliary storage unit 36, and may store the data and the relevance information definition in the main memory unit 32. The event detection means 1 acquires the data through the input unit 33 or the communication unit 35.

The event processing apparatus 30 may also be realized in the form of hardware by implementing a circuit configured by hardware components such as a large scale integration (LSI) in which a program for realizing the functions shown in FIG. 1 is embedded. Alternatively, the event processing apparatus 30 may be realized in the form of software by causing the CPU 31 of the computer to execute the program for realizing the functions shown in FIG. 1. In this case, the CPU 31 may realize the aforementioned functions with utilizing software by loading the program stored in the auxiliary storage unit 36 on the main memory unit 32 and executing the program so as to control the operation of the event processing device 30.

The communication unit 35 is connected to the peripheral devices, for transmission and reception of the data. As an example of the peripheral devices, an external storage apparatus 38 may be connected to the event processing device 30 via a network through the communication unit 35. The event detection means 1 may acquire the data stored in the external storage device 38. Further, the event processing apparatus 30 may store the event data supplied by the event display means 5 or the data including combination result of data, in the external storage device 38.

Figure 3:
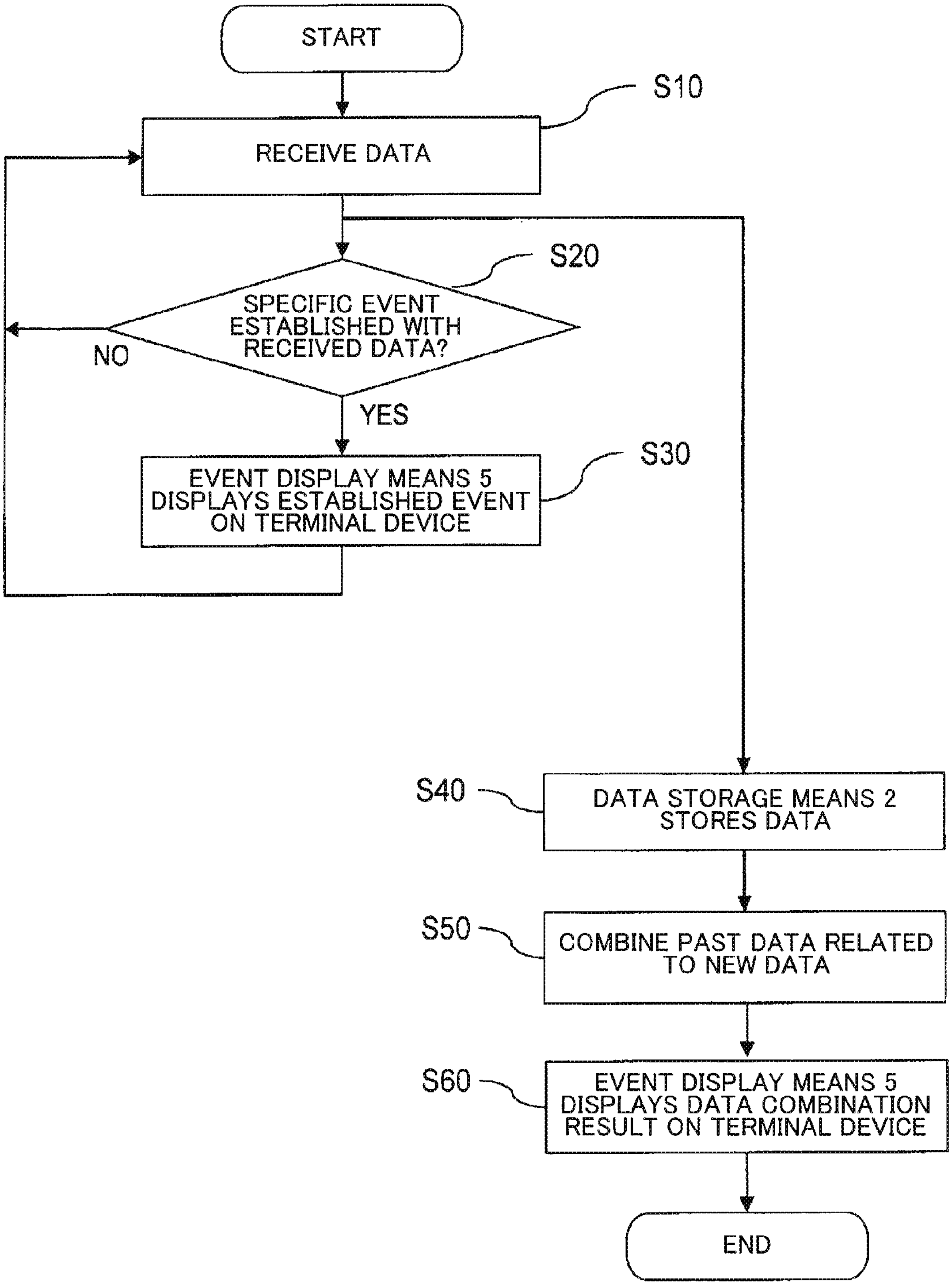
FIG. 3 is a flowchart showing an operation of the event processing apparatus according to the first exemplary embodiment of the disclosure.

FIG. 3 is a flowchart showing an operation of the event processing apparatus 10 according to this exemplary embodiment. When the event detection means 1 receives new data (step S10), the event detection means 1 checks the received data to determine whether an event is established, on the basis of the predetermined condition (step S20). The event detection means 1 may execute such determination using, for example, a known technology such like the CEP. Hereinafter, the determination process will be described with reference to a specific example.

FIG. 4 is an explanatory diagram showing examples of the data input into the event processing apparatus. The input data shown in FIG. 4 includes three items of input data (input data 1 to 3) each having properties such as type of detected information, date and time of detection, sensor (type of the sensor), sensor position, certainty factor, and detected content. It will be herein assumed that the event detection means 1 has received the input data shown in FIG. 4. The event detection means 1 detects the data as an event when, for example, the type of detected information of the input data corresponds to one of predefined values, and the input data at least includes the values indicating the date and time of detection, the sensor position, and the certainty factor, and the value of the certainty factor exceeds a predetermined threshold (for example 0.75). Then the event detection means 1 supplies the input data to the event display means 5 as an event.

When it is determined that the event is established in the step S20, the event display means 5 displays the event data supplied by the event detection means 1 on the terminal apparatus (step S30). At the same time, the data storage means 2 stores therein the input data received at step S10, irrespective of the result of the decision made at step S20 (step S40).

When the new data is stored in the data storage means 2, the integrated analysis means 3 determines the relevance between the new data and other data stored in the data storage means 2, on the basis of the relevance information definition stored in the relevance information definition storage means 4. The integrated analysis means 3 then combines the data relevant to each other (step S50). The integrated analysis means 3 performs such data combination with respect to each of the events. That is, in the case where the integrated analysis means 3 has determined that the data respectively constituting two events are related with each other, the integrated analysis means 3 combines such two events.

The information stored in the relevance information definition storage means 4, and the determination process performed by the integrated analysis means 3 will now be specifically described. FIG. 5 is an explanatory diagram showing examples of the definition of alert level included in the relevance information definition. FIG. 6 is an explanatory diagram showing examples of the definition of degree of relevance included in the relevance information definition. The relevance information definition storage means 4 stores the definition of the alert level, such as, for example, shown in FIG. 5, and the definition of the degrees of relevance, such as, for example, shown in FIG. 6. The definition of degree of relevance may be expressed in the form of a table such as shown in FIG. 6, or in a matrix pattern of the degree of relevance. In latter case, the vertical and horizontal axes of the matrix indicate the type of relevance information. The numeral number "119" in FIG. 6 represents the phone number for calling an ambulance in Japan.

Regarding the example described hereunder, it will be assumed that the type of detected information of the three items of input data, shown in FIG. 4, represents the name of the event, and that the three items are stored in the data storage means 2 as data representing the event. First, the integrated analysis means 3 refers to the input data 1 stored in the data storage means 2, and confirms that the type of detected information is "person lying down". This type of detected information corresponds to the alert level of 2, according to the definition of the alert level shown in FIG. 5. Then when the input data 2 is stored in the data storage means 2, the integrated analysis means 3 confirms that the type of detected information of the input data 2 is "scream", which corresponds to the alert level of 2.

The integrated analysis means 3 then determines the relevance between the events in accordance with input data 1 and the input data 2, each regarded as an event, on the basis of the degree of relevance, difference between dates and times of detection, and distance between sensor positions of the respective types of detected information. The integrated analysis means 3 refers to the definition of the degree of relevance stored in the relevance information definition storage means 4 shown in FIG. 6, as the degree of relevance between the types of detected information. In the case where the degree of relevance between the two types of detected information, which are compared with each other, exceeds a predetermined threshold, the integrated analysis means 3 determines that the types of detected information are related with each other.

In the case of input data and input data 2, the types of detected information of the input data 1 and the input data 2 are "person lying down" and "scream", respectively. And the degree of relevance between those two types of detected information is 0.4 (it will be assumed that the degree of relevance in FIG. 6 remains unchanged regardless that the order of the type of detected information 1 and the type of detected information 2 is reversed). Assuming that the threshold of the degree of relevance is set to 0.3, the integrated analysis means 3 determines that the types of detected information of the input data 1 and the input data 2 are related with each other, since 0.4 is higher than the threshold. The definition of the degree of relevance may be expressed, as described above, in the form of the table shown in FIG. 6 or in a matrix pattern. Further, in the case where the threshold of the degree of relevance is to be unchanged, the definition of the degree of relevance may be stored in the relevance information definition storage means 4, as the table only containing such combinations of which the degree of relevance exceeds the threshold.

The integrated analysis means 3 calculates the difference between the dates and times of detection and the distance between the sensor positions, by measuring a scalar distance expressed numerically. Regarding the date and time of detection, the date and time of detection of the input data 1 and the input data 2 are respectively expressed as "2013/06/14 21:40:14" and "2013/06/14 21:40:26", and the difference is expressed as 12 seconds, representing the difference in time. Likewise, the integrated analysis means 3 calculates the distance between two positions of the sensors, expressed in latitude and longitude as (34.687549, 135.526848) and (34.687684, 135.526609) respectively, thereby obtaining a value "0.000274492". Assuming that the threshold of the difference in date and time is set to 60 seconds and the threshold of the difference in sensor position is set to 0.000300, the integrated analysis means 3 determines that the input data 1 and the input data 2 are respectively data of a related event, and combines those data, since the both differences are lower than the respective thresholds.

When the integrated analysis means 3 combines data of another event to the data of the event newly stored in the data storage means 2, the integrated analysis means 3 transmits the combination result to the event display means 5. The event display means 5 then displays the data of the combined events on the screen of the terminal apparatus (step S60). When the input data 3 is additionally stored in data storage means 2, also, the integrated analysis means 3 likewise evaluates the degree of relevance and the difference in date and time of detections and distance of sensor positions, between the types of detected information, of the input data 1 and the input data 3 and the input data 2 and the input data 3. Then the integrated analysis means 3 combines the input data 1 and the input data 3 as related events because the condition is satisfied. In contrast, the degree of relevance between the respective types of detected information ("scream" and a specific utterance "ambulance") of the input data 2 and the input data 3 is 0.2 as shown in FIG. 6, which is lower than the threshold of 0.3. Therefore, the integrated analysis means 3 does not combine the input data 2 and the input data 3 as related events.

Figure 7:
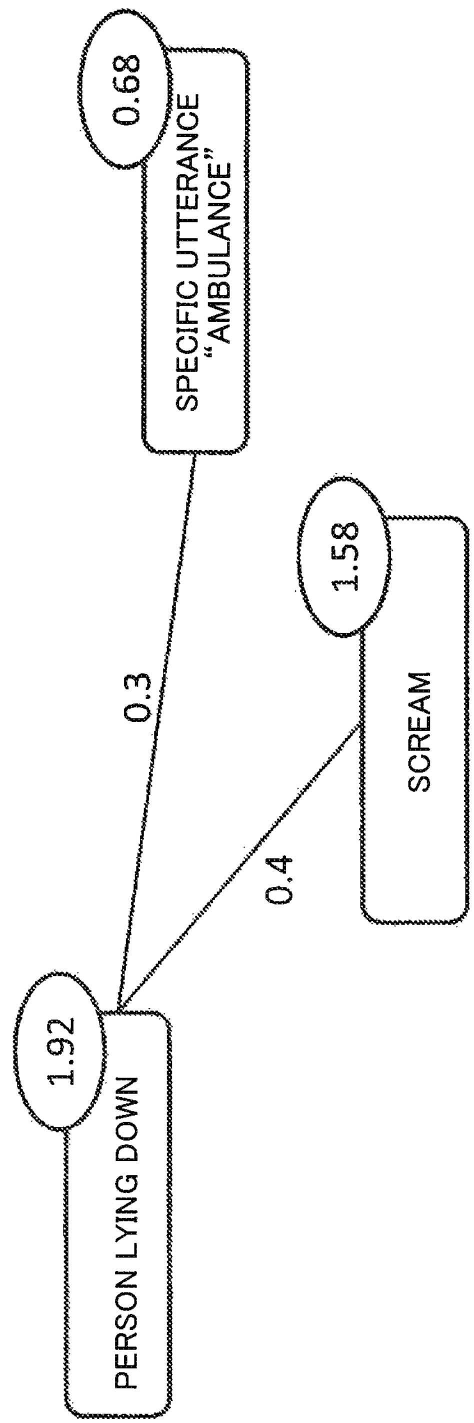
FIG. 7 is an explanatory diagram for explaining an example of combined events.

FIG. 7 is an explanatory diagram for explaining an example of the combined events. The result of the combination made by the integrated analysis means 3 may be expressed, for example, in a form of link among the events labelled by the value of the type of detected information, as shown in FIG. 7. In FIG. 7, the numerical number added to the right upper side of each node expressed by the label represents a value obtained by multiplying the alert level of the type of detected information and the certainty factor of the input data. The numerical number shown on the link line connecting the nodes represents the degree of relevance between the types of detected information of linked nodes. The integrated analysis means 3 may also transmit these values to the event display means 5 so as to display the values on the terminal screen, for example, as shown in FIG. 7. Thereby the integrated analysis means 3 enables that the user directly confirms the importance of each event and the degree of relevance of the associated event.

Figure 8:
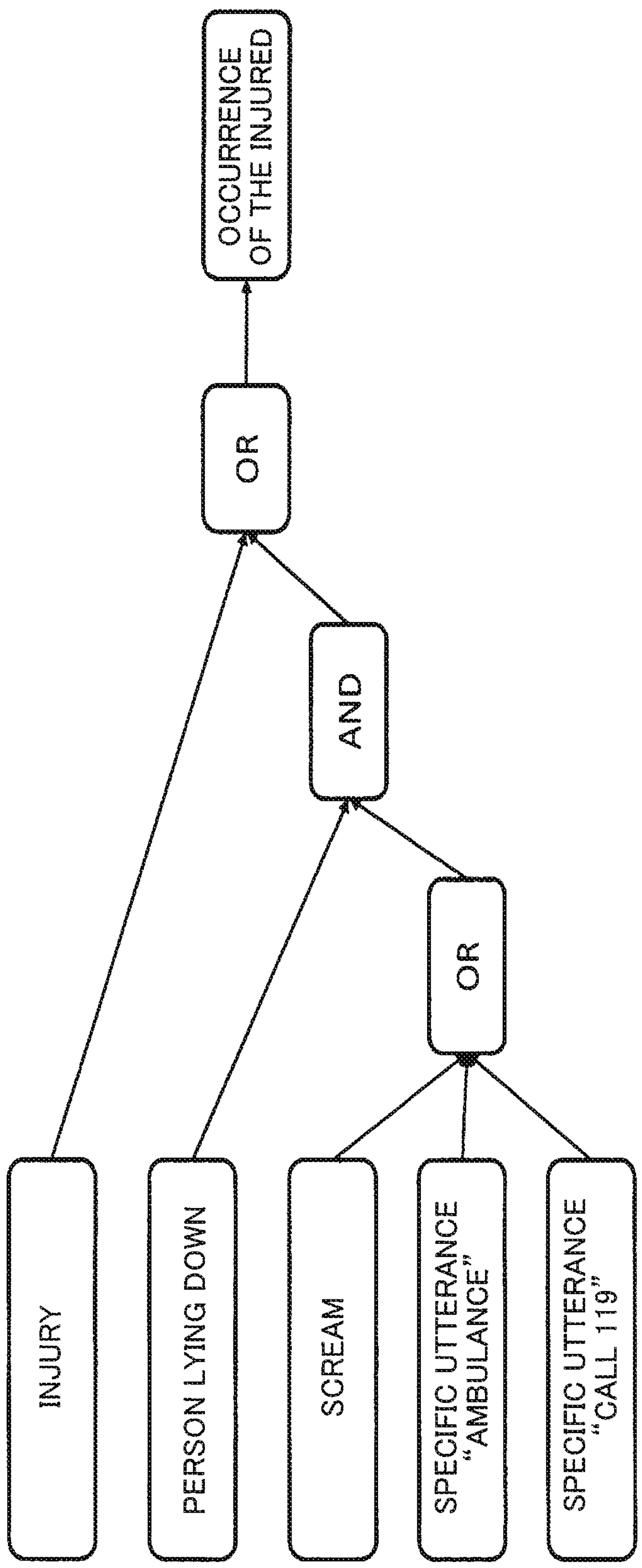
FIG. 8 is an explanatory diagram for explaining an example of predefined rule of the complex event.

FIG. 8 is an explanatory diagram for explaining an example of the predefined rule of the complex event. The relevance information definition storage means 4 may store logical relationship between the types of detected information such as shown in FIG. 8, and a new event that can be established when such relationship is satisfied ("occurrence of the injured" in the example shown in FIG. 8). The integrated analysis means 3 may supply the new event that has been established when one or more items of input data satisfy the relationship shown in FIG. 8, to the event display means 5, so as to display such new event on the terminal apparatus.

Figure 9:
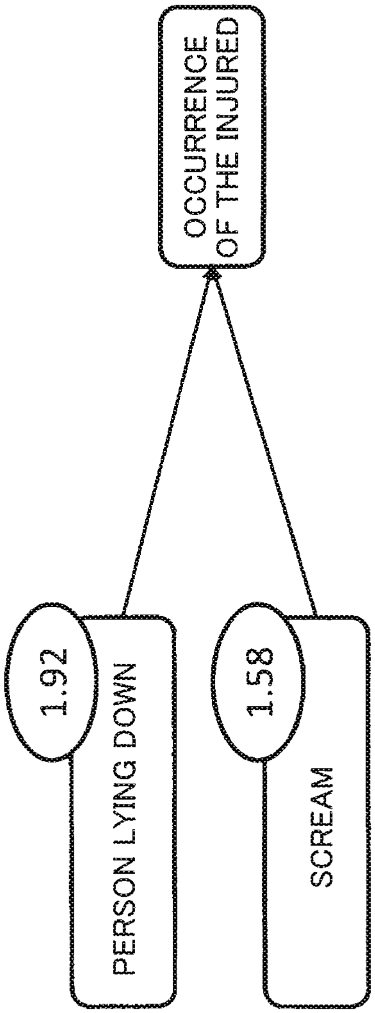
FIG. 9 is an explanatory diagram for explaining an example of the complex event detected according to the rule.

FIG. 9 is an explanatory diagram for explaining an example of the complex event detected according to the rule. Assuming a case that the logical relationship representing the condition for establishing "occurrence of the injured" shown in FIG. 8, is applied to the input event 1 to the input event 3 shown in FIG. 4. In this case, the event of "occurrence of the injured" is established as shown in FIG. 9, on the basis of the input data 1 and the input data 2 stored earlier in the data storage means 2.

Figure 10:
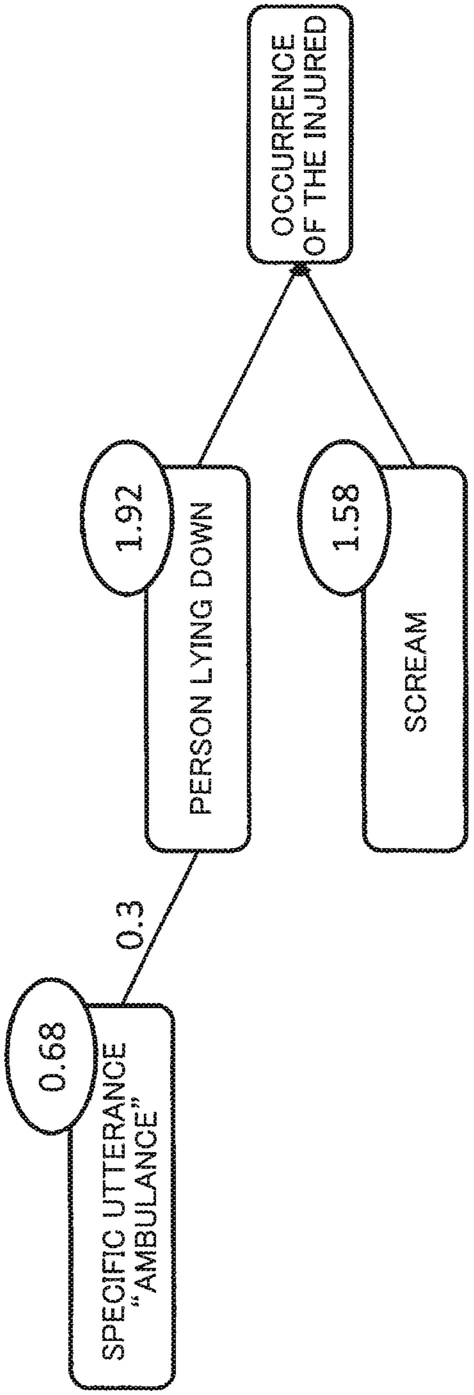
FIG. 10 is an explanatory diagram for explaining an example that a related event has been additionally combined with the complex event.

FIG. 10 is an explanatory diagram for explaining a case where a related event has been additionally combined with the complex event. Here, assuming a case that the relevance information definition storage means 4 also stores the definition of the alert level shown in FIG. 5 and the definition of the degree of relevance shown in FIG. 6. In this case, the integrated analysis means 3 can associate the input data 3 with the data of which the type of detected information is "person lying down", among the data constituting the event of "occurrence of the injured". Accordingly, the result shown in FIG. 10 can be obtained. The integrated analysis means 3 may supply the content representing the new events shown in FIG. 8 to FIG. 10, to the event display means 5, so as to display such new event on the terminal apparatus.

Figure 11:
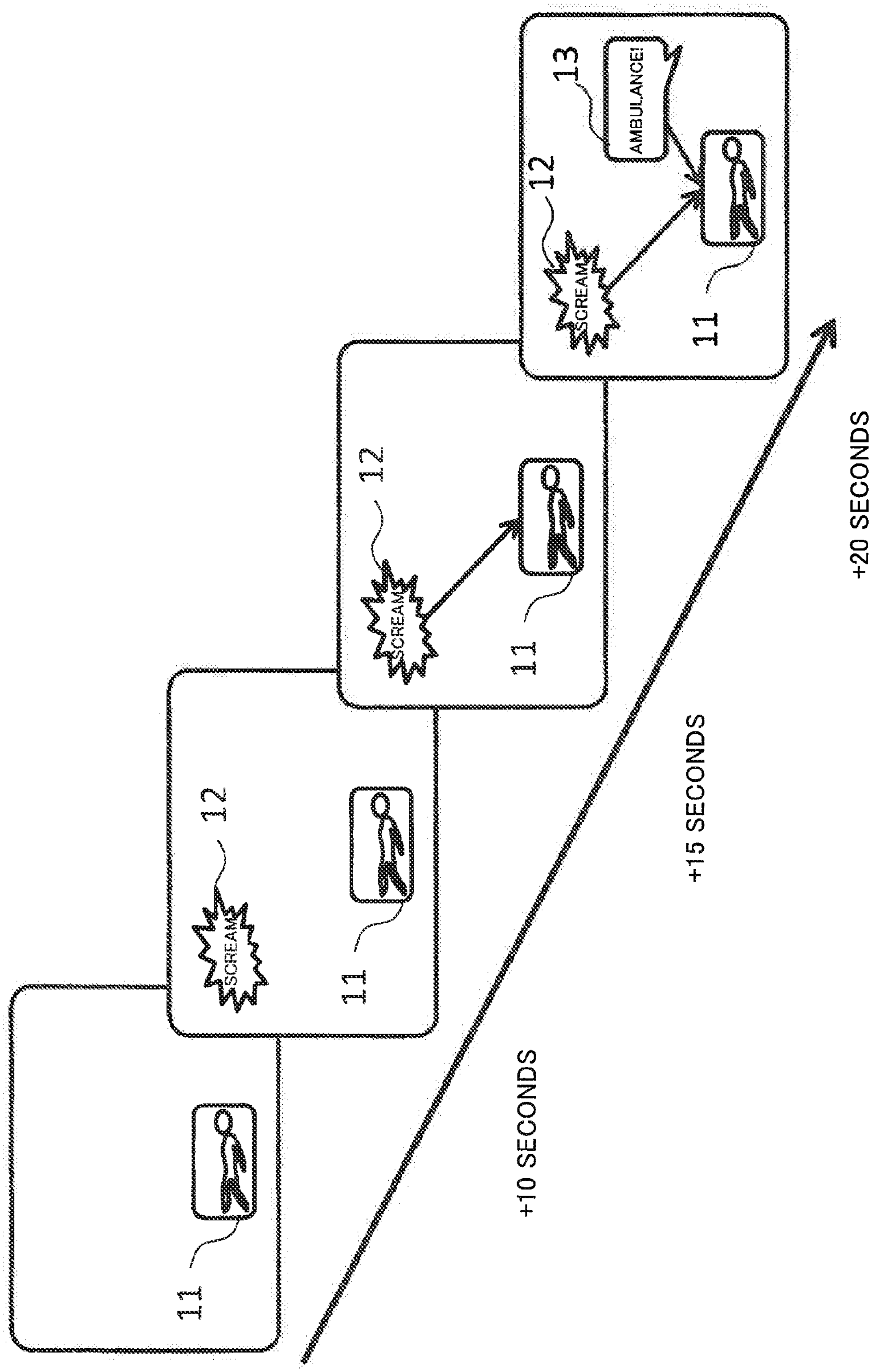
FIG. 11 is an explanatory diagram showing display examples of detected events.

FIG. 11 is an explanatory diagram showing display examples of the detected event. More specifically, FIG. 11 illustrates the event sequentially displayed on the terminal apparatus by the event display means 5. First, an event 11 detected by the event detection means 1 from the input data 1 is displayed. Here, it will be assumed, for example, that the type of detected information shown in FIG. 4 is used as the name of the event, and that the input data 1 corresponds to an event representing "person lying down". Then 10 seconds later, an event 12 representing "scream" detected from the input data 2 is displayed on the terminal screen. Further, 15 seconds later the combination result (event 11 and event 12 connected via an arrow in FIG. 11), derived from the relevance between "person lying down" and "scream" is displayed. Although an event 13 representing the specific utterance of "ambulance" has already been detected from the input data 3 at this point, the event 13 is not displayed because the value of the certainty factor does not exceed the threshold. However, since "scream" and the specific utterance of "ambulance" both represent the events related to the event represented by "person lying down", 20 seconds later the integrated analysis means 3 combines all such data and displays the result as shown in FIG. 11.

As described above, an event which is not to be displayed alone may be displayed depending on the degree of relevance with another event. Accordingly, the user of the terminal apparatus can easily recognize the whole aspect of the information detected with respect to the related events.

With the configuration described above, the event processing apparatus according to this exemplary embodiment promptly announces each of the events that have occurred. And in the case where the announced events are determined to be related with each other, the event processing apparatus according to this exemplary embodiment combines those events and sequentially announces the relevance. Further, the event processing apparatus according to this exemplary embodiment can also announce the occurrence of a new complex event composed of the plurality of events already announced, when the predetermined condition is satisfied. Such functions of the event processing apparatus according to this exemplary embodiment enable both immediacy and comprehensiveness of the event detection including combined events to be satisfied.

[Exemplary Embodiment 2]

Figure 12:
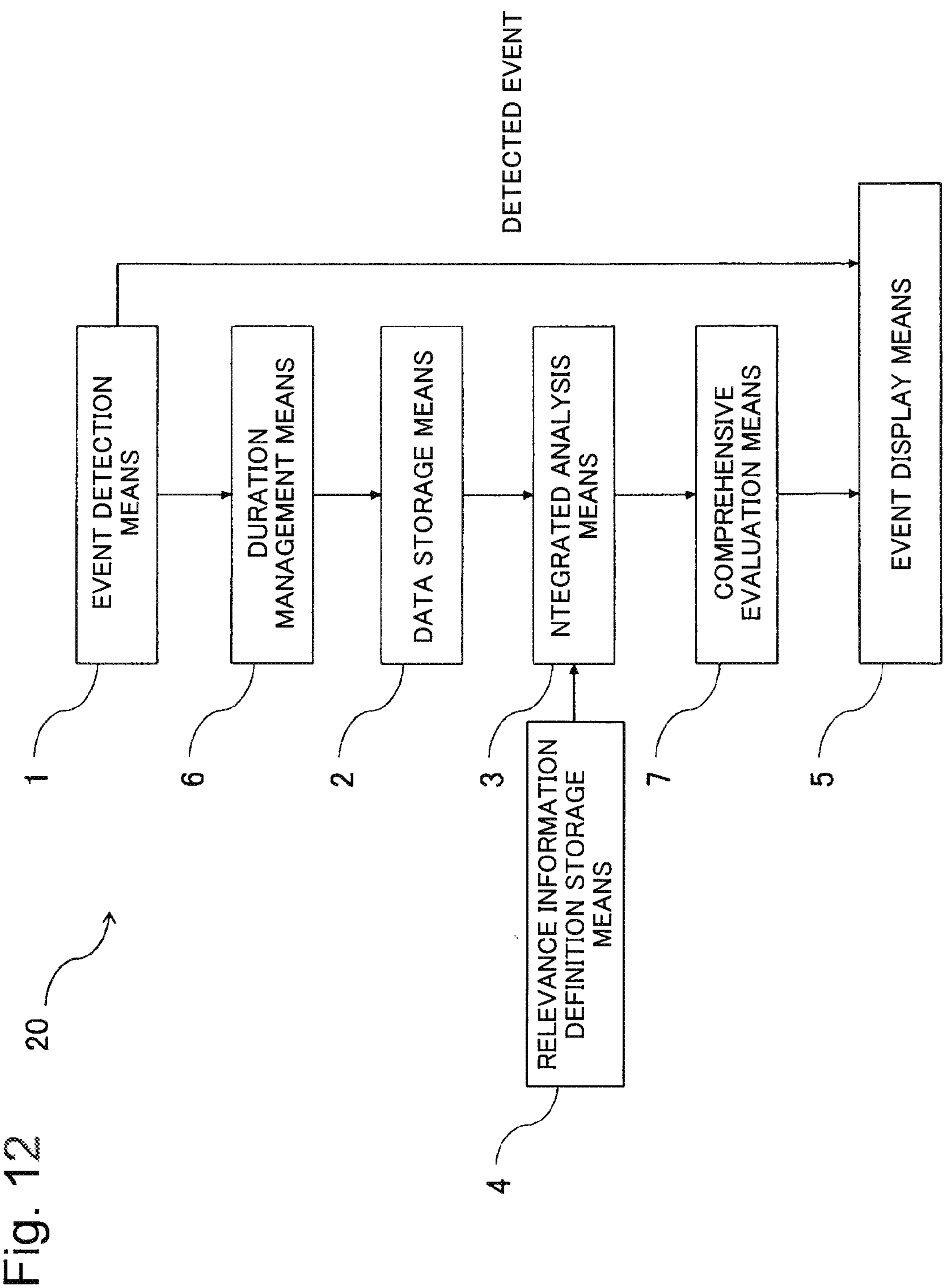
FIG. 12 is a block diagram showing a configuration of an event processing apparatus according to a second exemplary embodiment of the present disclosure.

Hereunder, a second exemplary embodiment of the disclosure will be described. FIG. 12 is a block diagram showing a configuration of an event processing apparatus 20 according to this exemplary embodiment. The event processing device 20 further includes duration management means 6 and comprehensive evaluation means 7, in addition to the configuration of the event processing apparatus 10 according to the first exemplary embodiment. The other constituents of the event processing apparatus 20 are the same as those of the event processing device 10, and hence the description thereof will be omitted.

The duration management means 6 restricts data newly provided to the event detection means 1 from being stored in the data storage means 2, in the case where the new data represents the same event as that represented by the previous data acquired from a transmission source which is the same as the transmission source (for example, a sensor) from which the information source of the new data was acquired. Instead, the duration management means 6 sets a continuation flag (not shown) of the data of the same event that previously occurred, and already stored in the data storage means 2. For example, it is assumed that the property of "continuation flag" is added to the data stored in the data storage means 2, and the value "1" of the continuation flag indicates a state that the flag is set (event is continued), and the value "0" of the continuation flag indicates a state that the flag is unset (event is not continued).

As another example of the case for representing the same event, the duration management means 6 may determine that the data represents the same event when the types of detected information and the sensor positions are the same, in addition to the sensor, in the example shown in FIG. 4. When acquiring data representing an event different from the previous one from certain sensor, the event detection means 1 clears the continuation flag (sets the value to 0) of the data representing the previous event acquired from the same sensor. The integrated analysis means 3 determines continuation and finish of the event on the basis of the continuation flag. Thus, the integrated analysis means 3 processes the data of which the continuation flag is set (value is set to 1), among the data stored in the data storage means 2.

The event processing apparatus 20 according to this exemplary embodiment, with utilizing the duration management means 6, can prevent the data representing the same event from being stored plural times in the data storage means 2, periodically through the event detection means 1, in the case where the event detected by the same sensor is continuously occurring (for example, when an left baggage remains placed for a long time). Therefore, the event processing apparatus 20 prevents the data representing the same event from being combined, as representing a plurality of events, each other. Here, the duration management means 6 may immediately delete the data, of which the value of the continuation flag has been cleared (changed from 1 to 0), from the data storage means 2, when value of the continuation flag is set to 0, unless the data is intended to be subsequently utilized for some purpose.

The comprehensive evaluation means 7 calculates a score of the entire data combined by the integrated analysis means 3. The score is used as information that represents the importance and reliability of the entire data as an event. For example, the comprehensive evaluation means 7 evaluates an event, to which data representing a plurality of events are associated, as an event having a larger scale and a larger impact on the surrounding circumstance. The comprehensive evaluation means 7 may assign a higher score to an event, for example when a larger number of items of data are combined. Otherwise, the comprehensive evaluation means 7 may assign a higher score to an event, for example when a larger number of items of data are associated with each other, because such an event contains a larger amount of circumstantial evidence and highly reliable.

The comprehensive evaluation means 7 may calculate the score, for example, with an equation (1) expressed as follows:

$$\text{Score}=\Sigma((\text{alert level})\times(\text{certainty factor})\times(\text{degree of relevance})) \quad (1)$$

Before applying the equation (1), the comprehensive evaluation means 7 determines the data that represents a primary event, among the data that are subject of the comprehensive evaluation. The comprehensive evaluation means 7 determines such data having a largest value of product of the alert level and the certainty fact, as the data representing the primary event, and regards other related data as the data representing a support event. In the example shown in FIG. 4, the input data 1 has the largest product of the alert level and the certainty factor, and therefore the input data 1, of which the type of detected information is "person lying down", is determined as the data representing the primary event. In other words, the event of "person lying down" is regarded as main event, and "scream" and the specific utterance "ambulance" are regarded as complementary event of the main event.

With the equation (1), the comprehensive evaluation means 7 calculates the value of "alert level×certainty factor×degree of relevance" with respect to each input data, and the total sum of such values constitutes the score. Here, the degree of relevance refers to the degree of relevance with respect to the primary event, for example expressed as shown in FIG. 6. The degree of relevance of the primary event itself is set to 1.0. Accordingly, the score can be calculated as follows upon applying the equation (1) to the data shown in FIG. 4:

"Score=(2×0.96×1.0)+(2×0.89×0.4)+(1×0.75×0.3)=2.857".

The event display means 5 displays the score calculated as above to the user, as value representing the importance and reliability of the primary event, together with the data combination result, through the terminal apparatus. Alternatively, the event display means 5 may display the result of data combination on the terminal apparatus, when the score exceeds a predetermined threshold.

The hardware configuration of the event processing apparatus according to this exemplary embodiment is the same as that shown in FIG. 2, and hence the description will be omitted. In this exemplary embodiment, the auxiliary storage unit 36 contains the program for executing the functions of the event detection means 1, the data storage means 2, the integrated analysis means 3, the relevance information definition storage means 4, the event display means 5, the duration management means 6, and the comprehensive evaluation means 7, that are shown in FIG. 12.

Figure 13:
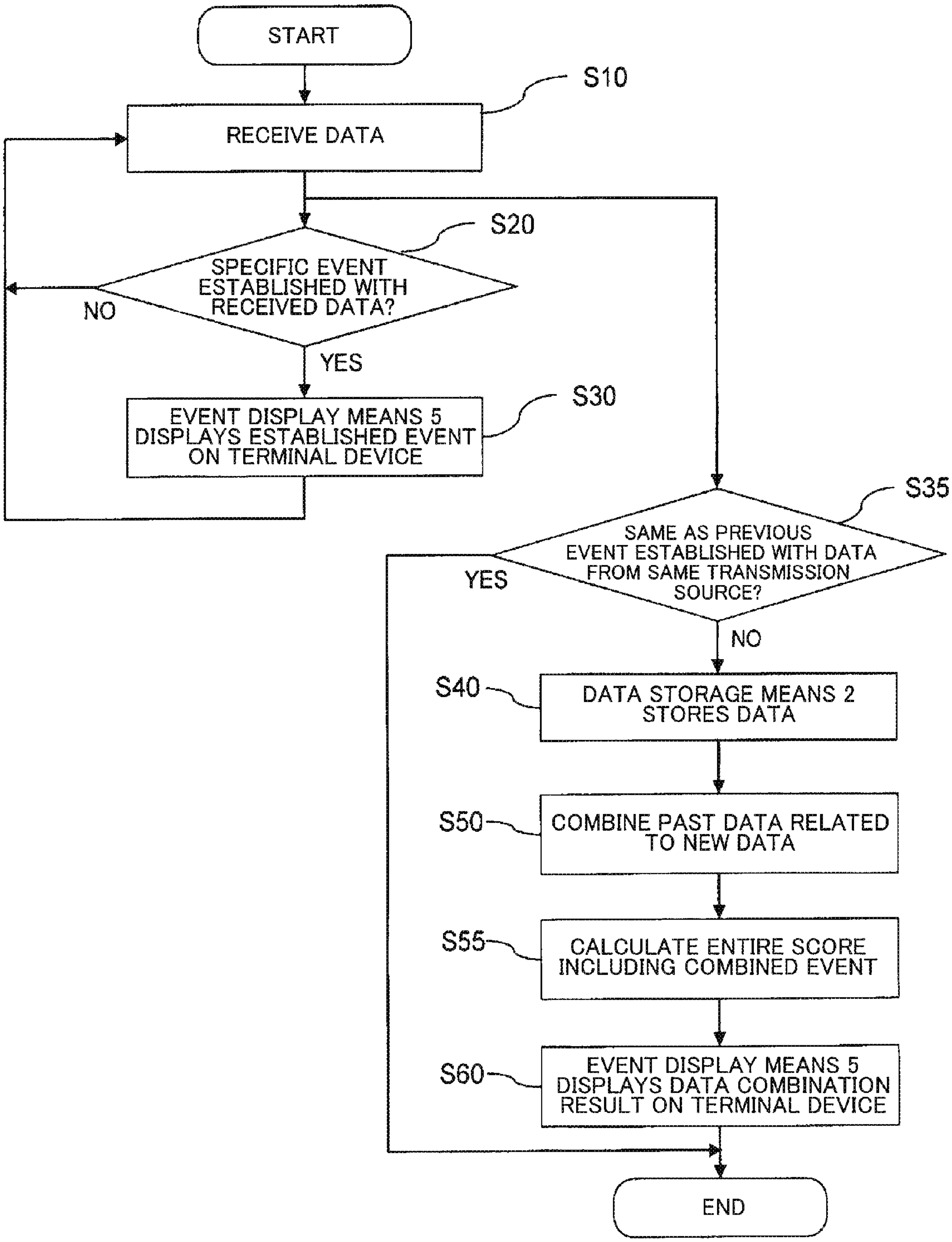
FIG. 13 is a flowchart showing an operation of the event processing apparatus according to the second exemplary embodiment of the present disclosure.

The operation of the event processing apparatus according to this exemplary embodiment will now be described hereunder. FIG. 13 is a flowchart showing the operation of the event processing apparatus according to this exemplary embodiment. In FIG. 13, the processes other than step S35, step S55, and step S60 are the same as those of the first exemplary embodiment shown in FIG. 3, and therefore the description of those steps will be omitted.

The duration management means 6 determines whether the data newly supplied to the event detection means 1 represents the same event represented by the previous data acquired from the transmission source (for example, a sensor) same as the transmission source of the new data (step S35). In the case where the condition of step S35 is satisfied, the duration management means 6 does not store the newly input data in the data storage means 2, and the process about the data is finished.

The comprehensive evaluation means 7 calculates the score of the entire data combined by the integrated analysis means 3 (step S55).

The event display means 5 displays the combined events and the score (step S60).

The event processing apparatus according to this exemplary embodiment, with utilizing the comprehensive evaluation means 7, enables to quantitatively indicate the importance and reliability of the main event, among the entire data representing the related events. Therefore, the user can utilize the displayed score to decide, for example, whether an immediate action is required or not.

Further, the event processing apparatus according to this exemplary embodiment prevents the data representing the same event from being repeatedly combined redundantly, with utilizing the duration management means 6. Therefore, the event processing apparatus according to this exemplary embodiment can prevent the comprehensive evaluation score from becoming largely deviated from the actual value because of the redundantly combined data.

Figure 14:
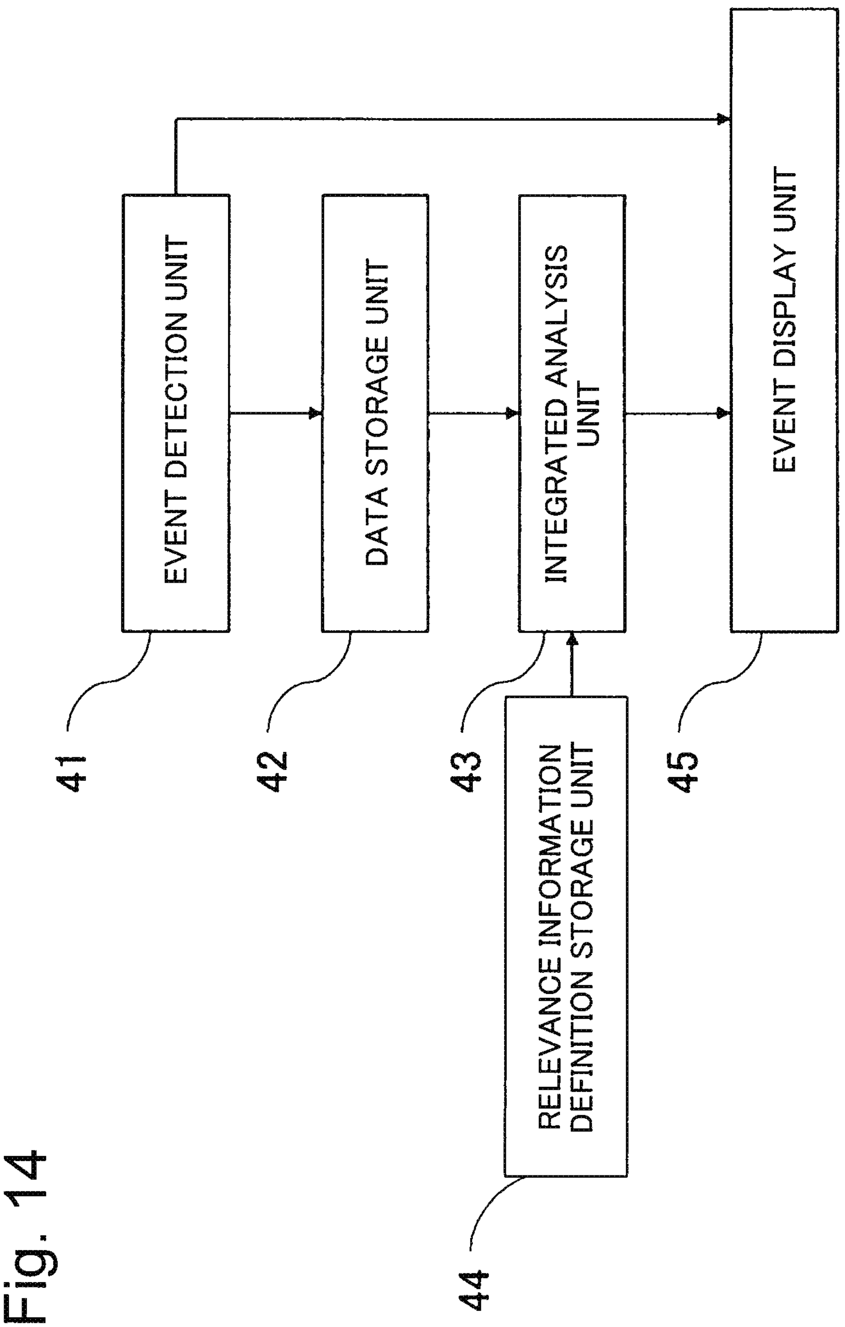
FIG. 14 is a block diagram showing a configuration of a main part of the event processing apparatus according to the disclosure.

FIG. 14 is a block diagram showing a configuration of a main part of the event processing apparatus according to the disclosure. As shown in FIG. 14, the event processing apparatus according to the present disclosure includes, as main constituent, an event detection unit 41 that detects the data as an event when the received data satisfies a predetermined condition. The event processing apparatus also includes a data storage unit 42 that stores therein the data received by the event detection unit 41 irrespective of the detection result of the event. The event processing apparatus also includes a relevance information definition storage unit 44 that stores therein the relevance information definition that represents definition of the relevance among the data. The event processing apparatus also includes an integrated analysis unit 43 that combines data newly stored in the data storage unit 42 with the past data, among the data stored in the data storage unit 42, of which relationship with the newly stored data satisfies the relevance information definition, when the newly stored data is stored in the data storage unit 42. The event processing apparatus further includes an event display unit 45 that displays the past data and the newly stored data combined with each other.

(1) In the event processing apparatus configured as above, the event detection means may promptly cause the event display means to display the detected event. Such an event processing apparatus enables the immediacy of the notification to be satisfied.

(2) The event processing apparatus may include comprehensive evaluation means (for example, the comprehensive evaluation means 7) which calculates a score indicating the importance and reliability of the entire data, including the newly stored data and the past data that are combined by the integrated analysis means. In addition, in the event processing apparatus, event display means may be configured to displays the score. The event processing apparatus configured as above enables the importance and reliability of the main event to be quantitatively indicated, on the basis of the entire data representing the related events. Therefore, the user can utilize the displayed score to decide, for example, whether an immediate action is required or not.

(3) In the event processing apparatus, the event display means may be configured to display the entire data combined by the integrated analysis means, only when the score calculated by the comprehensive evaluation means exceeds a predetermined threshold.

(4) The event processing apparatus may further include duration management means (for example, the duration management means 6) which determines whether an event detected from new data received by the event detection means is the same event as that represented by the previous data acquired from the same transmission source, and restricts the new data from being stored in the data storage means, when the new data is determined to be the same. Therefore, the event processing apparatus prevents the data representing the same event from being combined as representing a plurality of events.

(5) In the event processing apparatus, the duration management means may set a continuation flag of an event detected from the newly received data, when the event detected from the newly received data is the same event as the one detected from the previous data acquired from the same transmission source, and clear the continuation flag when an event different from the previous one is detected from the data acquired from the transmission source. Further, in the event processing apparatus the integrated analysis means may determine continuation and finish of an event on the basis of the continuation flag.

The present invention has been described with reference to the exemplary embodiments, the present invention is not limited to the foregoing exemplary embodiments. Various modifications obvious to those skilled in the art may be made to the configurations and specific details of the present invention, within the scope of the present invention.

This application claims priority based on Japanese Patent Application No. 2013-144775 filed on Jul. 10, 2013, the entire content of which is incorporated hereinto by reference.

INDUSTRIAL APPLICABILITY

The present disclosure is suitably applicable to event processing apparatuses that are required to promptly detect and notify an event that has occurred, and to associate partial events with each other and notify the occurrence of the event when a predetermined condition is satisfied, even when the occurrence of the event is unable to be immediately detected with a single item of, or a few specific items of sensor information.

REFERENCE SIGNS LIST

1 Event detection means
2 Data storage means
3 Integrated analysis means
4 Relevance information definition storage means
5 Event display means
6 Duration management means
7 Comprehensive evaluation means
10, 20, 30 Event processing apparatus
31 CPU
32 Main memory unit
33 Input unit
34 Output unit
35 Communication unit
36 Auxiliary storage unit
37 System bus
38 External storage apparatus
41 Event detection unit
42 Data storage unit
43 Integrated analysis unit
44 Relevance information definition storage unit
45 Event display unit

The invention claimed is:

1. An event processing apparatus, comprising:

an event detection unit that is configured to, when received data satisfies a predetermined condition, detect the data as an event;

a data storage unit that is configured to store the data received by the event detection unit irrespective of a detection result of the event;

a relevance information definition storage unit that is configured to store relevance information definition which defines relevance between the data;

an integrated analysis unit that is configured to, when data is newly stored in the data storage unit, combine the newly stored data with past data, among the data stored in the data storage unit, of which relationship with the newly stored data satisfies the relevance information definition;

an event display unit that is configured to display the event detected by the event detection unit; and a comprehensive evaluation unit that is configured to calculate a score indicating reliability of an entire data including the newly stored data and the past data that are combined by the integrated analysis unit, wherein the integrated analysis unit calculates the score in such a way that the reliability increases according to an increase in a number of data of the past data is combined with the newly stored data, and wherein the event display unit further displays the past data and the newly stored data combined by the integrated analysis unit, and displays the score.

2. The event processing apparatus according to claim 1, wherein the event display unit displays the entire data combined by the integrated analysis unit, only when a value of the score calculated by the comprehensive evaluation unit exceeds a predetermined threshold.

3. The event processing apparatus according to claim 1, further comprising a duration management unit that is configured to determine whether an event detected from new data received by the event detection unit is a same event as the event represented by previous data acquired from a same transmission source, and to restrict the new data from being stored in the data storage unit, when the new data is determined to be the same.

4. The event processing apparatus according to claim 3, wherein the duration management unit sets a continuation flag of an event when the event detected from the newly received data is a same event as the event detected from the previous data acquired from the same transmission source, and clears the continuation flag when an event different from the previous event is detected from the data acquired from the transmission source, and wherein the integrated analysis unit determines continuation and finish of the event on a basis of the continuation flag.

5. The event processing apparatus according to claim 1, wherein the relevance information further defines relevance between the data and a rule, the rule including a logical relationship between the data and a complex event being established when the logical relationship is satisfied.

6. The event processing apparatus according to claim 5, wherein the integrated analysis unit is further configured to detect the complex event when a relationship between the newly stored data and the past data satisfies the rule.

7. The event processing apparatus according to claim 6, wherein the integrated analysis unit is further configured to combine the past data with the data constituting the complex event, when a relationship between the past data and the data constituting the complex event satisfies the relevance information definition.

8. The event processing apparatus according to claim 5, wherein the integrated analysis unit is further configured to combine the past data with the data constituting the complex event, when a relationship between the past data and the data constituting the complex event satisfies the relevance information definition.

9. The event processing apparatus according to claim 1, wherein the data that satisfies the predetermined condition is received from a sensor.

10. The event processing apparatus according to claim 9, wherein the relationship with the newly stored data farther satisfies a condition regarding a degree of relevance between the data, a condition regarding a position of the sensor included in the data, and a condition regarding a date and a time of detection of the data, in the relevance information definition.

11. An event processing method, comprising:

detecting, when received data satisfies a predetermined condition, the received data as an event;

storing the received data in data storage unit irrespective of a detection result of the event;

combining, when data is newly stored in the data storage unit, the newly stored data with past data, among the data stored in the data storage unit, of which relationship with the newly stored data satisfies relevance information definition which defines relevance between the data;

calculating a score indicating reliability of an entire data including the newly stored data and the past data combined with each other, wherein the score is calculated in such a way that the reliability increases according to an increase in a number of data of the past data is combined with the newly stored data; and displaying the past data and the newly stored data combined with each other and displaying the score.

12. The event processing method according to claim 11, wherein the relevance information further defines relevance between the data and a rule, the rule including a logical relationship between the data and a complex event being established when the logical relationship is satisfied.

13. The event processing method according to claim 12, further comprising detecting the complex event when a relationship between the newly stored data and the past data satisfies the rule.

14. The event processing method according to claim 13, further comprising combining the past data with the data constituting the complex event, when a relationship between the past data and the data constituting the complex event satisfies the relevance information definition.

15. The event processing method according to claim 12, further comprising combining the past data with the data constituting the complex event, when a relationship between the past data and the data constituting the complex event satisfies the relevance information definition.

16. A non-transitory computer-readable storage medium that stores an event processing program configured to cause a computer to execute:

an event detection process including detecting, when received data satisfies a predetermined condition, the received data as an event, and storing the received data in data storage unit irrespective of a detection result of the event;

an integrated analysis process including combining, when data is newly stored in the data storage unit, the newly stored data with past data, among the data stored in the data storage unit, of which relationship with the newly stored data satisfies relevance information definition defining relevance between the data;

a comprehensive evaluation process including calculating a score indicating reliability of an entire data including the newly stored data and the past data combined with each other, wherein the score is calculated in such a way that the reliability increases according to an increase in a number of data of the past data is combined with the newly stored data; and a data display process including displaying the past data and the newly stored data combined with each other and displaying the score.

* * * * *